(12) United States Patent
Wanierke et al.

(10) Patent No.: US 10,826,650 B1
(45) Date of Patent: Nov. 3, 2020

(54) METHOD OF AND DEVICE FOR DECODING MULTIPLE TRANSMISSIONS OF TIME RELATED DATA AS WELL AS A METHOD OF VERIFYING A DEVICE FOR DECODING MULTIPLE TRANSMISSIONS OF TIME RELATED DATA

(71) Applicant: Rohde & Schwarz GmbH & Co. KG, Munich (DE)

(72) Inventors: Otmar Wanierke, Munich (DE); Christoph Hausi, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/413,338

(22) Filed: May 15, 2019

(51) Int. Cl.
*H04L 1/00* (2006.01)
*H04B 1/10* (2006.01)
*H04L 27/227* (2006.01)

(52) U.S. Cl.
CPC ......... *H04L 1/0054* (2013.01); *H04B 1/1027* (2013.01); *H04L 1/0061* (2013.01); *H04L 27/2273* (2013.01)

(58) Field of Classification Search
CPC ... H04L 5/0048; H04L 1/0054; H04L 1/0061; H04L 27/2273; H04W 36/0005; H04W 36/08; H04B 1/1027
See application file for complete search history.

(56) References Cited

U.S. PATENT DOCUMENTS

2018/0331802 A1* 11/2018 Bhattad ................ H04L 1/0047
2018/0375696 A1* 12/2018 Sadiq ................ H04L 25/03866
2019/0081659 A1* 3/2019 Ratnam ................ H04L 5/0057

* cited by examiner

*Primary Examiner* — Janice N Tieu
(74) *Attorney, Agent, or Firm* — Christensen O'Connor Johnson Kindness PLLC

(57) ABSTRACT

A method of decoding multiple transmissions of time related data is provided. The method comprises receiving and recognizing separate data blocks, each data bock having data that comprises at least a code word assigned to a system frame number that depends on the transmission time of the respective data block; demodulating each data block in order to obtain IQ-samples, likelihood ratios or representatives thereof for each data block; accumulating the IQ-samples, likelihood ratios or representatives thereof to a sum that is forwarded to a single-block decoder; and decoding the sum, thereby obtaining decoding results. Further, a device for decoding multiple transmissions of time related data as well as a method of verifying a device for decoding multiple transmissions of time related data are described.

15 Claims, 2 Drawing Sheets

METHOD OF AND DEVICE FOR DECODING MULTIPLE TRANSMISSIONS OF TIME RELATED DATA AS WELL AS A METHOD OF VERIFYING A DEVICE FOR DECODING MULTIPLE TRANSMISSIONS OF TIME RELATED DATA

FIELD OF THE DISCLOSURE

Embodiments of the present disclosure relate generally to a method of decoding multiple transmissions of time related data. Further, embodiments of the present disclosure relate generally to a device for decoding multiple transmissions of time related data. In addition, embodiments of the present disclosure relate to a method of verifying a device for decoding multiple transmissions of time related data.

BACKGROUND

In modern mobile communication networks, for instance 5G-NR, broadcast channel (BCH) messages are exchanged between a base station as well as a receiver such as a mobile phone or any other mobile device. Typically, these messages are periodically transmitted and contain payload with constant data as well as data that depends on the transmission time, for instance the system frame number (SFN). The respective receiver has to decode the multiple transmitted messages in order to access the payload.

However, the receivers are not able to decode the transmitted messages if the signal-to-noise ratio (SNR) falls below a specific threshold. In other words, the receivers are not able to decode the transmitted messages under difficult channel conditions.

So far, techniques are known to ensure decoding of messages under difficult channel conditions only for messages that have identical payload, which however is not applicable for messages containing data that depends on the transmission time such as the system frame number.

Accordingly, there is a need for a possibility to decode multiple transmitted messages under difficult channel conditions even though the data transmitted comprise data that depends on the transmission time.

SUMMARY

Embodiments of the present disclosure provide a method of decoding multiple transmissions of time related data. In some embodiments, the method comprises the following steps:

receiving and recognizing separate data blocks, each data block having data that comprises at least a code word assigned to a system frame number that depends on the transmission time of the respective data block;

demodulating each data block in order to obtain IQ-samples, likelihood ratios or representatives thereof for each data block;

accumulating the IQ-samples, likelihood ratios or representatives thereof to a sum that is forwarded to a single-block decoder; and decoding the sum, thereby obtaining decoding results.

Further, embodiments of the present disclosure provide a device for decoding multiple transmissions of time related data. The device comprises at least two receiving channels and a demodulation module configured to demodulate data blocks received via the at least two receiving channels in order to obtain IQ-samples, likelihood ratios or representatives thereof. Each data bock has data that comprises at least a code word assigned to a system frame number that depends on the transmission time of the respective data block. In addition, the device comprises an accumulation module assigned to the demodulation module as well as a single-block decoder with only one input, wherein the single-block decoder is connected to the accumulation module.

Accordingly, multiple transmissions or rather messages, namely the separate data blocks, are received by the device at different points in time and processed appropriately in order to reduce the signal-to-noise ratio (SNR) threshold for successful decoding. Hence, the multiple messages or rather transmissions can be decoded even under difficult (broadcast) channel conditions.

In some embodiments, the likelihood-ratios may relate to log-likelihood ratios.

In general, the likelihood-ratio, and in some embodiments the log-likelihood ratio, provides a probability whether the respective symbol, for instance a bit, has a certain value. For example, a bit may have the values "0" or "1".

The signal-to-noise ratio threshold gain may be given by $10 \cdot \log_{10}(k)$, wherein k denotes the number of data blocks received. The respective signal-to-noise ratio threshold gain is provided in dB.

As the system frame number depends on the transmission time of the respective data block, the payload is different for each data block transmitted, namely each message transmitted. The payload may comprise additional constant data that may relate to the bandwidth of the transmission channel, settings and configuration data of the radio network and/or data indicating where to find more detailed information.

Generally, the device may correspond to a receiver that has a multi-block decoder connected to a single-block decoder. The multi-block decoder receives and processes multiple transmissions of time related data, namely data blocks with data that depends on the transmission time of the respective data block. These processed multiple transmissions are forwarded to the single-block decoder that outputs the decoding results finally. In some embodiments, the functionality of the device or the blocks thereof can be implemented in logic circuits, programmed microprocessors, or the like, with or without associated digital or analog components. Other implementations may also be practiced with embodiments of the present disclosure.

Furthermore, the IQ samples obtained from the demodulating step may be accumulated directly. For instance, IQ samples assigned to data blocks modulated according to Quadrature Phase-Shift Keying (QPSK) technique can be scaled and accumulated directly.

According to an aspect, frame-number differences of the data blocks are determined based on knowledge of frame duration, wherein certain IQ-samples, likelihood ratios or representatives thereof obtained are modified by using the frame-number differences determined in order to compensate respective code word differences of the data blocks with regard to time. Hence, the modified IQ-samples, likelihood ratios or representatives thereof may be accumulated. The compensation of the respective code word differences relate to the change of code word over time, which is compensated appropriately, as an internal clock of the device for decoding the multiple transmissions of time related data is configured to measure the lapse of time and, thus, derives the change in system frame number therefrom.

Further, receive time differences of the data blocks may be determined. The frame-number differences are determined based on the knowledge of frame duration and the receive time differences of the data blocks. For instance, absolute receive times of the respective data blocks are measured while the receive time differences are derived from the absolute receive times measured. Alternatively receive time differences are measured directly with respect to a reference data block that serves as the reference point in time. Put another way, the receive time of the reference data block corresponds to a reference time that is used directly for measuring the respective receive time differences of the other data blocks received at other points in time, for example later.

In any case, the device may have a clock, for example an internal one, that is used for determining the receive times or rather receive time differences of the separate data blocks.

Another aspect provides that at least one of the frame-number differences and the code word differences correspond to differences with respect to a reference data block that comprises a reference code word assigned to a reference frame number. As mentioned above, the reference data block may be the data block that is used for determining the respective receive time differences of the other data blocks received later. Accordingly, the frame-number differences are calculated with respect to the frame number of this specific data block, namely the reference data block. In a similar manner, the code word differences also correspond to the change of the respective code word of the different data blocks over time with respect to the reference code word, namely the code word of the reference data block.

Generally, the reference data block may correspond to the first received data block within a decoding sequence. This means, all other data blocks are received later than the reference data block within the same decoding sequence.

Further, the reference frame number may be determined based on a systematic trial and error approach according to which all possible values for the reference frame number are tried for decoding. Put another way, all possible values for the reference frame number are tried for decoding based on a systematic trial and error approach. For instance, in 5G-NR 10 bits are provided, which result in 1024 different possible values for the reference frame-number that are tried in a systematic manner.

In some embodiments, the systematic trial and error approach may comprise the steps of:

in case that decoding was not successful for all considered reference frame numbers, more data blocks are received;

in case that decoding was successful for a single considered reference frame number, the decoding result is forwarded to a next instance; and/or in case that decoding was successful for more than one considered reference frame number, a further decision routine is performed in order to choose a single decoding result to be forwarded to a next instance.

Accordingly, embodiments of the method generally ensures that a (broadcast) channel may be decoded even if the bandwidth of the respective receiver is smaller than the bandwidth of the (broadcast) channel while combining a number of received data blocks whereas the receiver can change its carrier-frequency over time in order to collect different bandwidth-parts of the (broadcast) channel. In case the number of received blocks is equal to the ratio of the bandwidth of the channel to the bandwidth of the receiver, the receiver is able to achieve the same SNR-threshold as a receiver without bandwidth-limitation for one received block.

If a single value was found, the decoding was successful such that this single value can be forwarded to the next instance for processing. Generally, the successful decoding means that an available parity check (CRC) was successful and the decoded system frame-number (SFN) is equal to the value of the (reference) frame-number used in the compensation process.

According to an aspect, the further decision routine in some embodiments comprises the steps of:

re-encoding the more than one found decoding results in order to obtain re-encoded symbols or IQ-samples;

forwarding for all successful decoding results the re-encoded symbols or IQ-samples to a sequence decoder that outputs a measure for the similarity of the re-encoded symbols or IQ-samples with the received likelihood ratios or IQ-samples; and choosing the single decoding result based on the sequence-decoder output values.

In some embodiments, the symbols may relate to bits.

The sequence decoder is generally a decoder that is enabled to receive multiple high frequency sequences. Generally, the sequence decoder in some embodiments may be configured to:

split a sequence received into a plurality of chunks;

equalize the (broadcast) channel by using a first subset of the plurality of chunks;

measure the amplitude of each chunk of a second subset of the plurality of chunks in the equalized radio frequency channels and use the at least one amplitude for deciding whether the at least one sequence of the signal corresponds to a sequence listed in a list.

In some embodiments, the (currently assumed) reference frame number is provided as a priori knowledge to the single block decoder. Thus, the decoding probability is increased at bad signal-to-noise ratios of the respective channel while assuming or rather estimating the respective reference frame number that is used for determining the frame-number differences of the respective data blocks received.

Another aspect of the disclosure provides that at least one group of reference frame numbers is formed, wherein each member of the group has the identical code word difference, wherein all possible groups are tried for decoding based on a systematic trial and error approach. Thus, it is not necessary to perform the trial and error approach for all possible values of the reference frame number for each data block, as the respective steps have to be conducted only for each group once since all members of that group have the same code word difference. Thus, the computational complexity can be reduced significantly.

Put another way, it is verified which of the data blocks received lead for all the respective code words to the same code word difference compensation. For linear encoding-methods, the system frame numbers groups (SFN-groups) can be calculated efficiently with the help of the following properties:

The set N={0, 1, . . . , N−1} contains all SFNs (e.g. for 5G-NR there are N=1024 SFNs).

The set D={d_1=(n1−n0), d_2=(n2−n0), d_k=(nk−n0)} contains all frame-number differences with respect to the first or rather reference frame number n0.

The set N is split into S disjoint sets whereas these sets are denoted as SFN-groups. The s-th SFN-group contains the elements G_s={g_s0, g_s1, . . . }

All elements in one SFN-group G_s have to fulfill the property that for all 3-tuples {i, j, k} the equation ((g_si+d_k) mod N) xor g_si is identical to ((g_sj+d_k) mod N) xor g_sj.

In case the encoding chain contains additionally a SFN-dependent payload-scrambling (e.g. for 5G-NR the payload-scrambling depends on the 2nd and 3rd least significant bits, also called LSB, of the SFN) the following property has to be fulfilled additionally:

All elements in one SFN-group G_s have to fulfill the property that for all 3-tuples {j, k}:
either the payload-scrambler of g_si and g_sj is identical
or the payload-scrambler is identical for g_si and g_si+d_k and identical for g_sj and g_sj+d_k.

In case that specific SFN-bits are identical for all elements in one SFN-group, the single-block decoder can exploit this knowledge as a priori information or rather a priori knowledge.

In general, each data block may comprise several symbols. The symbols may correspond to modulated symbols, for instance QPSK symbols.

Further, each data block may have an additional payload that comprise same constant binary data. The constant binary data relates to the constant data.

Furthermore, the system frame number may also be transmitted as binary data.

The system frame numbers are interpreted as an outer code, wherein the code words are interpreted as an inner code. Hence, it is not necessary to assume a value for the reference frame number in advance. In addition, it is not necessary to conduct the trial and error approach, as the system frame numbers, for example their generation, are interpreted as a code that is to be decoded by the receiver.

For instance, the inner code and the outer code are decoded iteratively, thereby passing log-likelihood ratios of decoded versions of the code words between the inner code and the outer code. Accordingly, the frame numbers as well as the coding are decoded jointly by an iterative process. Depending on the number of iterations, the computational complexity may increase.

According to another aspect, the separate data blocks are received on different carrier-frequencies. Thus, signals or rather data blocks assigned to different parts of the (broadcast) channel can be collected by the device or rather the receiver. The device may change its carrier-frequency for acquisition over time in order to collect different bandwidth-parts of the (broadcast) channel. Hence, the (broadcast) channel may be decoded even if the bandwidth of the respective receiver is smaller than the bandwidth of the (broadcast) channel.

Another aspect of the disclosure provides that a compensation module is interconnected between the demodulation module and the accumulation module. The compensation module is configured to compensate respective code word differences of the data blocks with regard to time by modifying certain IQ samples, likelihood ratios or representatives thereof obtained. Hence, code word differences may be compensated as described above to which reference is made.

In some embodiments, the multi-block decoder may comprise the demodulation module, the accumulation module and the optional compensation module. The multi-block decoder is connected with the single-block decoder.

Accordingly, the device, for instance the receiver, may comprise the multi-block decoder connected in series with the single-block decoder.

The device, for example the single-block decoder, may output an estimated reference frame number. Furthermore, an estimation for the constant data may be outputted, which is based on the reference code word.

In addition, embodiments of the device as well as embodiments of the method enable improvement in the estimation of the receive power by comparing the received data blocks with re-encoded decoding results of the estimates of the constant data and the (reference) frame number.

Further, the present disclosure provides a method of verifying a device for decoding multiple transmissions of time related data. In some embodiments, the method includes the following steps:

connecting the device to be verified with a signal generator;

generating a first signal with standard-conform incrementation;

measuring a first threshold for successful decoding while forwarding the first signal to the device to be verified;

generating a second signal without standard-conform incrementation;

measuring a second threshold for successful decoding while forwarding the second signal to the device to be verified; and comparing the first and the second thresholds measured with each other.

In some embodiments, it can be verified whether or not the device for decoding multiple transmissions of time related data is a device as described above. Alternatively or additionally, it can be verified whether or not the device for decoding multiple transmissions of time related data uses a method as described above, namely a method of decoding multiple transmissions of time related data.

In case the threshold is (much) lower for the signal with standard-conform incrementation, this is a proof that the method described above or rather the device described above is used. Put another way, if the first threshold is (much) lower than the second threshold, this is a proof that the method described above or rather the device described above is used.

The standard-conformity relates to the respective standard of a certain signal having a standard, for instance 5G or rather New Radio (NR). For instance, the standard-conform incrementation is a standard-conform system frame number (SFN) incrementation.

For instance, the standard 5G or rather NR relates to 1024 system frame numbers. Accordingly, a standard-conform incrementation may relate to the numbers (index) 0 to 1023 for the standard 5G-NR in the respective order.

In some embodiments, a signal with standard-conform incrementation means that after a certain period of time, for instance every 10 ms, the system frame number (SFN) is incremented by 1 and goes from 0 to 1023 for the standard 5G-NR. Hence, it relates to a 10 bit number.

Put another way, a signal without standard-conform incrementation may relate to an arbitrary incrementation, for instance "5", "8", "9", "3" and so on.

Generally, the threshold relates to a SNR threshold or a signal-generator-power threshold.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
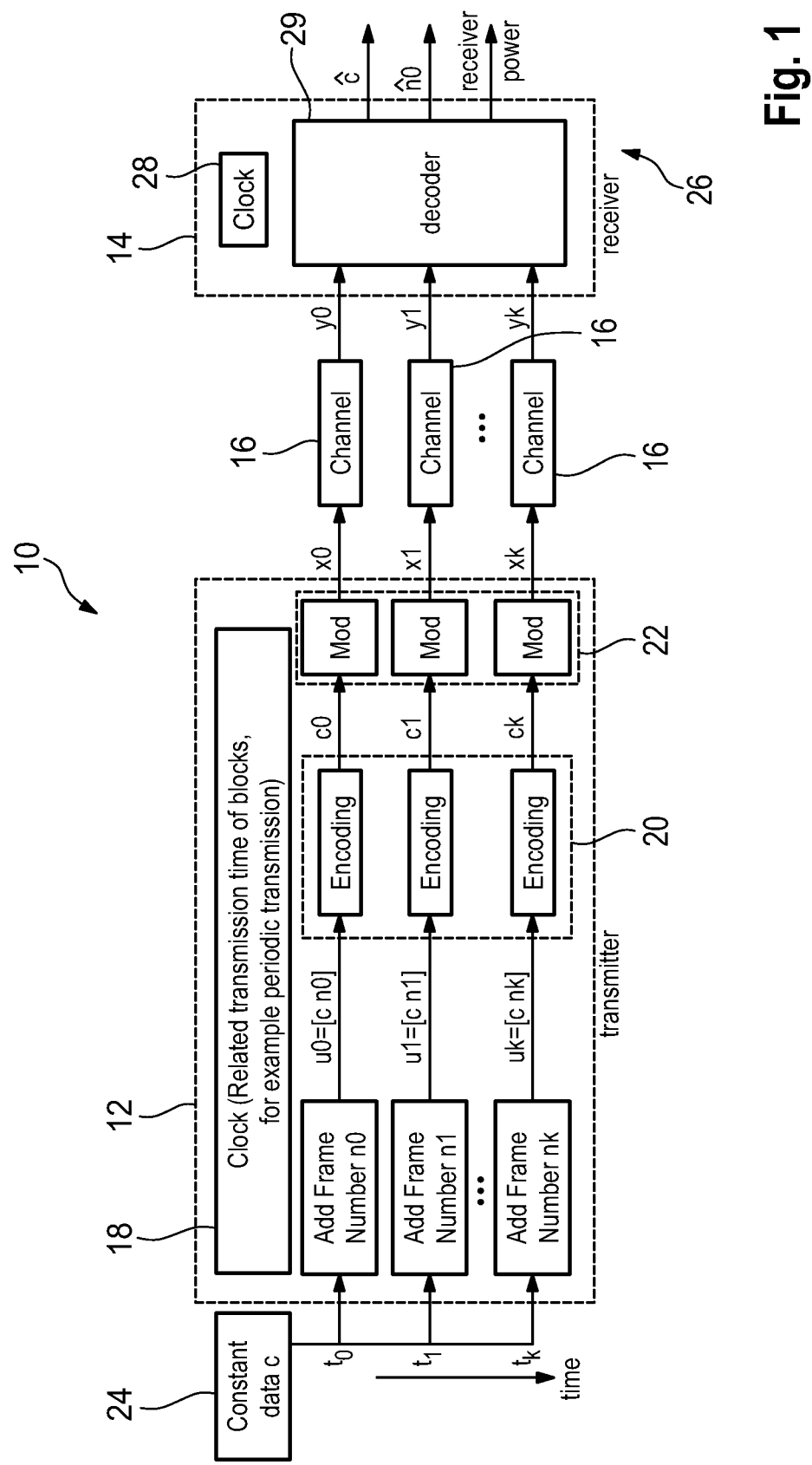
FIG. 1 schematically shows an overview of a mobile communication network comprising a representative embodiment of a device for decoding multiple transmissions of time related data.

FIG. 1 schematically shows a mobile communication network 10 that comprises a transmitter 12 as well as a receiver 14 that communicate with each other via several (broadcast) channels 16. The transmitter 12 is generally configured to transmit messages to the receiver 14 via the channels 16 at different points in time, for instance periodically The transmitter 12 has an internal clock 18, an encoding module 20 as well as a modulation module 22. Further, the transmitter 12 is assigned to a data source 24 that can be accessed for transmitting respective constant data c that is contained in the messages transmitted.

As already mentioned, the transmitter 12 is generally configured to transmit multiple messages in a periodic manner. Thus, the clock 18 ensures that the respective transmissions of data blocks is done periodically.

For transmitting the respective data blocks, the transmitter 12 accesses the data source 24 in order to obtain constant data c to which a time-dependent frame number n0 to nk is added so as to obtain a respective symbol u0 to uk.

Then, symbols u0 to uk is encoded in the encoding module 20 so as to obtain a code words c0 to ck. The code words c0 to ck obtained are modulated in the modulation module 22 such that data blocks x0 to xk are obtained, which are transmitted via the channel 16 towards the receiver 14, which in turn receives the data blocks as a transmitted data blocks y0 to yk.

The data blocks y0 to yk received by the receiver 14 may be disturbed by noise or other influences that occur in the channel 16. Accordingly, the received data blocks y0 to yk are denoted differently with respect to the transmitted data blocks x0 to xk.

As shown in FIG. 1, the transmitter 12 transmits k+1 data blocks at different transmission times t0 to tk. Accordingly, the symbols, code words as well as data blocks are denoted by the indices "0" to "k" for distinguishing their time dependency. Put another way, k+1 frame numbers, namely n0 to nk, k+1 symbols, namely u0 to uk, k+1 code words, namely c0 to ck, as well as k+1 data blocks, namely x0 to xk, are provided.

As a consequence, the receiver 14 receives k+1 data blocks, namely y0 to yk, at k+1 different points in time that relate to the transmission times t0 to tk. Generally, the receiver 14 corresponds to a device 26 for decoding the multiple transmissions of time related data. Therefore, the device 26 has to determine the receive times or rather receive time differences of the different messages, namely the data blocks y0 to yk.

For this purpose, the receiver 14 or rather the device 26 has a clock 28 that provides timing information. Accordingly, the receiver 14 or rather the device 26 comprise the clock 28 as well as a decoder 29 that will be described in more detail with reference to FIGS. 2 and 3.

Generally, the receiver 14 or rather the device 26 is configured to output an estimate of the constant data c, which is denoted by ĉ. Further, the receiver 14 or rather the device 26 is configured to output an estimation of a reference frame number n, which is denoted by ñ0, of a reference data block received, namely the first one in the decoding sequence. Hence, the reference data block corresponds to the one denoted by y0 that relates to the frame number n0. In some embodiments, the receiver 14 or rather the device 26 is configured to output an estimation of the receive power.

Figure 2:
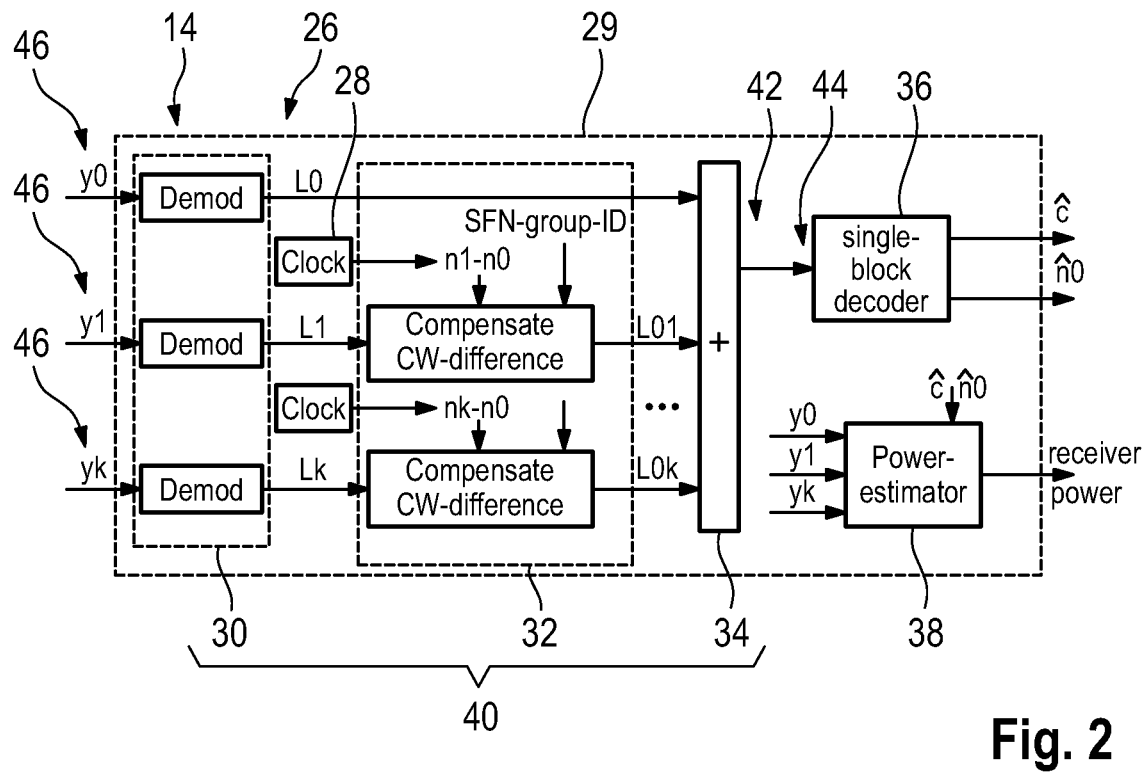
FIG. 2 shows a representative embodiment of a device for decoding multiple transmissions of time related data according to the present disclosure.

In FIG. 2, a schematic overview of a representative embodiment of the receiver 14 is shown in more detail. FIG. 2 reveals that the receiver 14, particularly the device 26, has a demodulation unit 30, a compensation module 32, an accumulation module 34, a single-block decoder 36 as well as a power estimator 38.

The demodulation unit 30, the compensation module 32 as well as the accumulation module 34 relate to a multi-block decoder 40 that has a single output 42 via which the multi-block decoder 40 is connected to a single input 44 of the single-block decoder 36, as shown in FIG. 2.

The demodulation module 30 is connected with several receiving channels 46 via which the receiver 14 receives the separate data-blocks y0 to yk which were transmitted as the data-blocks x0 to xk by the transmitter 12 via the channels 16. The data blocks y0 to yk received are recognized as separate data blocks and demodulated by the demodulation module 30 in order to obtain IQ-samples, likelihood-ratios or representatives thereof.

Typically, IQ samples are obtained that may be processed further to obtain likelihood-ratios, for instance log-likelihood ratios as will be discussed hereinafter. However, it is also possible to further process the IQ samples directly (without determining likelihood-ratios thereof).

In the shown embodiment, log-likelihood ratios L0 to Lk are obtained for each data block y0 to yk received.

For certain data blocks y1 to yk of all data blocks received, frame-number differences n1−n0 to nk−n0 are determined based on the knowledge of the frame duration as well as timing signals obtained from the internal clock 28. The frame-number differences n1−n0 to nk−n0 are determined with respect to the reference data block y0 received, namely the first one in the decoding sequence.

For doing so, receive time differences of the certain data blocks y1 to yk received, namely all received data blocks except for the reference data block y0, are determined. The receive time differences are measured directly with reference to the receive time of the first received data block y0 that corresponds to the reference data block for the respective decoding sequence.

Alternatively, the absolute receive times of the several data blocks received y0 to yk are measured wherein the receive time differences of the certain data blocks y1 to yk are derived from the absolute receive times by subtracting the later ones from the first one, namely the receive time of the first or rather reference data block y0.

With help of the frame-number differences n1−n0 to nk−n0 determined, certain log-likelihood ratios obtained previously are modified. In some embodiments, the log-likelihood ratios L1 to Lk are modified that are assigned to the certain data blocks y1 to yk, which were put in relation to the first data block y0 used as the reference data block.

By modifying the certain log-likelihood ratios L1 to Lk, code word differences c1−c0 to ck−c0 of the respective data blocks y1 to yk with regard to time can be compensated. In fact, the deviation of the code words over time, which occurs due to the transmission at different points in time, can be compensated appropriately.

The modified log-likelihood ratios L01 to L0k obtained from the compensation module 32 all refer to the specific code word c0 of the reference data block y0, which is the encoded version of the symbol u0 of the reference data block y0. As the modified log-likelihood ratios all refer to the code word c0, they are denoted by L01 to L0k.

Afterwards, the log-likelihood ratio L0 of the reference data block y0 as well as all modified log-likelihood ratios L01 to L0k are accumulated in the accumulation module 34 so as to obtain a single value, namely the sum, that is outputted as a single value that is received the single-block decoder 36.

In other words, the log-likelihood ratios L0, L01 to L0k are summed up wherein the sum obtained is forwarded to the single-block decoder 36 that delivers estimates about the constant data c of the messages transmitted as well as the frame number n0 of the reference data block y0.

In case of a signal modulation like Quadrature Phase-Shift Keying (QPSK), the IQ samples obtained may be scaled and summed up in the accumulation module 34 in order to obtain a sum. Then, the sum is forwarded to the single-block decoder 36. The power estimator 38 also receives the separate data blocks y0 to yk as well as the estimated values for the constant data ĉ and the estimated reference frame number 110, which were outputted by the single-block decoder 36. The power estimator 38 outputs an estimation of the receive power.

As already indicated in FIG. 2, the compensation of the code word differences c1−c0 to ck−c0 might depend, besides on the frame-number differences n1−n0 to nk−n0, also on the reference frame number n0 itself. Therefore, the reference frame number n0 should be taken into account. This can be done, for example, by estimating the reference frame number n0 or providing the reference frame number n0 as a priori knowledge.

Alternatively, the reference frame number n0 is determined based on a systematic trial and error approach according to which all possible values for the reference frame number n0 are tried for decoding the messages received, namely the data blocks y0 to yk. For instance, the communication standard 5G-NR is assigned to 10 bits such that the reference frame number n0 may have one of 1024 values, which are tried in a systematic manner.

In the trial and error approach, the following sub-steps may be done.

In case that a value was not successfully found for the reference frame number n0, more data-blocks are received and processed. Put another way, the decoding sequence is increased in order to have more data.

In case that a single value was found for the reference frame number n0, the single value found is forwarded to the next instance. Hence, the compensation of the code word differences n1−n0 to nk−n0 can be performed, as described above while using the single value found. Finding a single value might correspond to a successful decoding.

Generally, a successful decoding means that an available parity check (CRC) was successful and the decoded system frame number (SFN) is equal to the value of the (reference) frame number used in the compensation process.

In case that more than one value was found for the reference frame number n0, a further decision routine is performed in order to choose a single value to be used for the reference frame number n0, namely for the compensation of the code word differences n1−n0 to nk−n0.

The further decision routine may relate to specific criteria, for instance where the estimate of the received power is maximized or using a sequence decoder.

Further, the computational complexity can be reduced by forming at least one group of system frame number wherein each member of the respective group has the identical code word difference. Thus, the respective steps described above for compensating the code word difference have to be done for each group only once.

The steps described above are repeated for all SFN-groups until decoding by the single-block decoder 36 is successful.

In an alternative, the system frame numbers n0 to nk provided by the transmitter 12 are interpreted as an outer code, wherein the code words c0 to ck are interpreted as an inner code. Then, the inner code and the outer code are decoded iteratively, thereby passing log-likelihood ratios LLRs of decoded versions u0 to uk of the code words c0 to ck between the inner code and the outer code.

Figure 3:
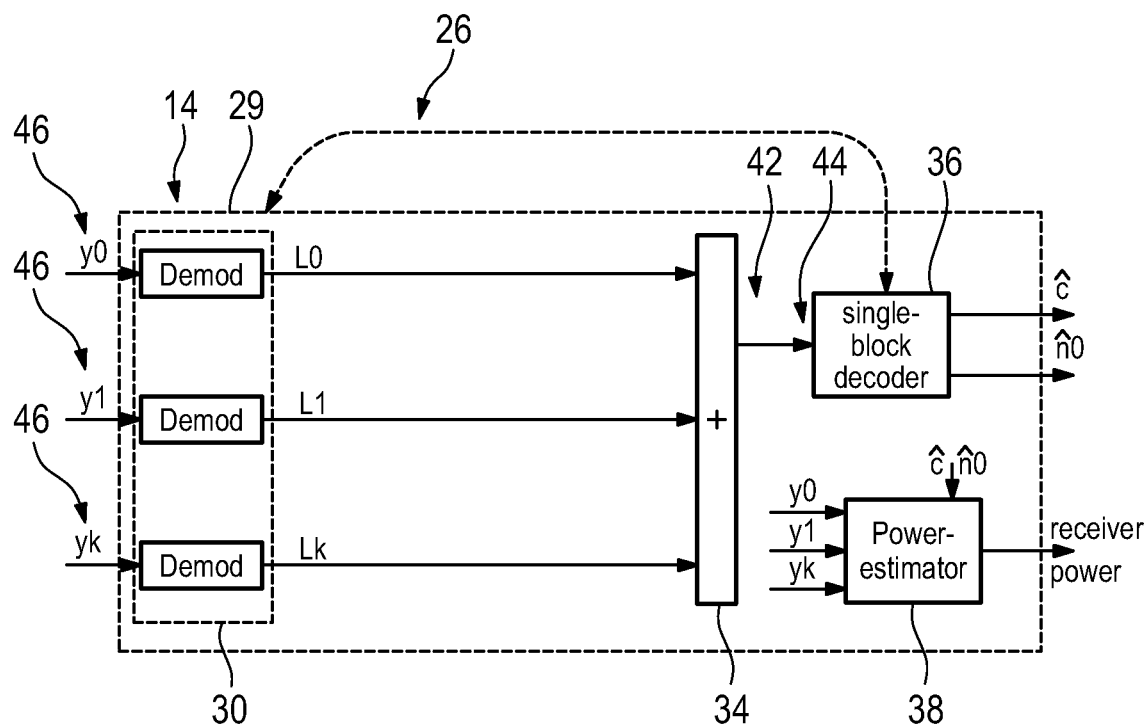
FIG. 3 shows another representative embodiment of a device for decoding multiple transmissions of time related data according to the present disclosure.

This may result in reduced processing power because it is not necessary to assume a value for the reference frame number n0 in advance. In fact, it is not necessary to try different values for the reference frame number n0. However, this variant might lead to increased computational complexity depending on the chosen number of iterations used. In FIG. 3, a variant of the receiver 14 or rather device 26 is shown. In this embodiment, the device 26 does not comprise the compensation module 32, as it is not necessary to compensate the code word differences n1−n0 to nk−n0.

The frame numbers assigned to the respective transmissions are interpreted as an outer code that is additionally provided to the inner code to be decoded by the single-block decoder 36.

As mentioned above, it is not necessary to try different values for the reference frame number n0. Furthermore, it is not necessary to estimate or rather assume the value for the reference frame number n0, as the frame numbers are interpreted as a code that has to be decoded by the device 26.

The frame numbers, namely the outer code, as well as the code words are decoded by the device 26 jointly in an appropriate manner, namely in an iterative manner.

In general, the device 26 as well as the method described ensure that multiple transmitted messages can be decoded even under difficult channel conditions, which means at signal-to-noise ratio (SNR) is below a specific threshold.

Furthermore, the device 26 as well as the respective method ensure that broadcast channels can be decoded even if the bandwidth of the receiver 14 is smaller than the bandwidth of the broadcast channel by combining a number of data blocks.

In case the number of received data blocks is equal to the ratio of the bandwidth of the (broadcast) channel to the bandwidth of the device 26, namely the receiver, the device 26 is able to achieve the same SNR-threshold as a receiver without bandwidth-limitation for one received block.

The device 26 may be verified by connecting the device 26 with a signal generator, for instance a conventional signal generator, such as a hardware based generator or a software based generator. In some embodiments, the signal generator may relate to the transmitter 12 shown in FIG. 1.

The signal generator may generate a first signal with standard-conform incrementation. For instance, a 5G-NR signal is generated wherein the system frame number (SFN) is incremented by 1 and goes from 0 to 1023. The threshold for successful decoding while forwarding the first signal to the device 26 to be verified. The respective threshold is labelled as a first threshold as it is assigned to the first signal. Then, the signal generator generates a second signal without standard-conform incrementation. Again, the threshold for successful decoding while forwarding the second signal to the device 26 to be verified. The respective threshold is labelled as a second threshold as it is assigned to the second signal.

Afterwards, the thresholds, namely the first one and the second one, are compared with each other in order to identify which of the thresholds is the lower one. In case that the first threshold, namely the threshold assigned to the signal with standard-conform incrementation, is (much) lower than the other one, this indicates that the device 26 uses the method described above.

It will be understood that one or more of the components, such as the encoding module 20, modulation module 22, demodulation unit 30, compensation module 32, accumulation module 34, etc., etc., described above, may include, in some embodiments, logic for implementing the technologies and methodologies described herein. This logic of one or more of these components can be carried out in either hardware or software, or a combination of hardware and software.

In an example, the functionality of one or more of these components could be implemented by special purpose hardware-based computer systems or circuits, etc., or combinations of special purpose hardware and computer instructions. In some embodiments, one or more of these components includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, one or more of these components include a microprocessor and a memory storing logic modules and/or instructions. In an embodiment, one or more of these components include one or more ASICs having a plurality of predefined logic components. In an embodiment, the one or more modules include one or more FPGA having a plurality of programmable logic components. In an embodiment, one or more of these components includes combinations of circuits and computer program products having software or firmware instructions stored on one or more computer readable memories that work together to cause a device to perform one or more methodologies or technologies described herein. In an embodiment, one or more of these components includes hardware circuits (e.g., implementations in analog circuitry, implementations in digital circuitry, and the like, and combinations thereof) for carrying out the functionality described herein.

The present application may reference quantities and numbers. Unless specifically stated, such quantities and numbers are not to be considered restrictive, but exemplary of the possible quantities or numbers associated with the present application.

Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of decoding multiple transmissions of time related data, comprising:
   receiving and recognizing separate data blocks, each data block having data that comprises at least a code word assigned to a system frame number that depends on the transmission time of the respective data block;
   demodulating each data block in order to obtain IQ-samples, likelihood ratios or representatives thereof for each data block;
   accumulating the IQ-samples, likelihood ratios or representatives thereof to a sum that is forwarded to a single-block decoder; and
   decoding the sum, thereby obtaining decoding results,
   wherein frame-number differences of the data blocks are determined based on knowledge of frame duration, and wherein certain IQ-samples, likelihood ratios or representatives thereof obtained are modified by using the frame-number differences determined in order to compensate respective code word differences of the data blocks with regard to time.

2. The method according to claim 1, wherein receive time differences of the data blocks are determined, the frame-number differences being determined based on the knowledge of frame duration and the receive time differences of the data blocks.

3. The method according to claim 1, wherein at least one of the frame-number differences and the code word differences correspond to differences with respect to a reference data block that comprises a reference code word assigned to a reference frame number.

4. The method according to claim 3, wherein the reference data block corresponds to the first received data block within a decoding sequence.

5. The method according to claim 3, wherein all possible values for the reference frame number are tried for decoding based on a systematic trial and error approach.

6. The method according to claim 5, wherein the systematic trial and error approach comprises:
   in case that decoding was not successful for all considered reference frame numbers, more data blocks are received;
   in case that decoding was successful for a single considered reference frame number, the decoding result is forwarded to a next instance; and/or
   in case that decoding was successful for more than one considered reference frame number, a further decision routine is performed in order to choose a single decoding result to be forwarded to a next instance.

7. The method according to claim 6, wherein the further decision routine comprises:

re-encoding the more than one found decoding result in order to obtain re-encoded symbols or IQ-samples;

forwarding for all successful decoding results the re-encoded symbols or IQ-samples to a sequence decoder that outputs a measure for the similarity of the re-encoded symbols or IQ-samples with the received likelihood ratios or IQ-samples; and choosing the single decoding result based on the sequence-decoder output values.

8. The method according to claim 5, wherein the reference frame number is provided as a priori knowledge.

9. The method according to claim 3, wherein at least one group of reference frame numbers is formed, each member of the group having the identical code word difference, and wherein all possible groups are tried for decoding based on a systematic trial and error approach.

10. The method according to claim 1, wherein each data block comprises at least one of several symbols and an additional payload with the same constant binary data.

11. The method according to claim 1, wherein the system frame numbers are interpreted as an outer code, and wherein the code words are interpreted as an inner code.

12. The method according to claim 11, wherein the inner code and the outer code are decoded iteratively, thereby passing log-likelihood ratios of decoded versions of the code words between the inner code and the outer code.

13. The method according to claim 1, wherein the separate data blocks are received on different carrier-frequencies.

14. A device for decoding multiple transmissions of time related data, comprising:

at least two receiving channels;

a first demodulator configured to demodulate data blocks received via the at least two receiving channels in order to obtain IQ samples, likelihood ratios or representatives thereof, each data bock having data that comprises at least a code word assigned to a system frame number that depends on the transmission time of the respective data block;

an accumulator assigned to the first demodulator; and a second, single-block decoder with only one input, the single-block decoder being connected to the accumulator, wherein a compensation module is interconnected between the demodulation module and the accumulation module, the compensation module being configured to compensate respective code word differences of the data blocks with regard to time by modifying certain IQ samples, likelihood ratios or representatives thereof obtained.

15. A method of decoding multiple transmissions of time related data, comprising:

receiving and recognizing separate data blocks, each data block having data that comprises at least a code word assigned to a system frame number that depends on the transmission time of the respective data block;

demodulating each data block in order to obtain IQ-samples, likelihood ratios or representatives thereof for each data block;

compensating respective code word differences of the data blocks with regard to time by modifying certain IQ samples, likelihood ratios or representatives thereof obtained;

accumulating the IQ-samples, likelihood ratios or representatives thereof to a sum that is forwarded to a single-block decoder; and decoding the sum, thereby obtaining decoding results.

* * * * *